United States Patent
Knez et al.

(10) Patent No.: US 7,138,001 B2
(45) Date of Patent: Nov. 21, 2006

(54) PARTIAL OXIDATION REFORMER-REFORMING EXCHANGER ARRANGEMENT FOR HYDROGEN PRODUCTION

(75) Inventors: Stanislaus A. Knez, Pearland, TX (US); Avinash Malhotra, Sugar Land, TX (US); David P. Mann, Katy, TX (US); Martin J. Van Sickels, Spring, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 10/708,606

(22) Filed: Mar. 15, 2004

(65) Prior Publication Data

US 2004/0177555 A1    Sep. 16, 2004

Related U.S. Application Data

(60) Provisional application No. 60/320,011, filed on Mar. 16, 2003.

(51) Int. Cl.
*B01J 3/24* (2006.01)

(52) U.S. Cl. ............ 48/198.3; 48/197 R; 48/199 FM; 48/127.3; 48/127.9; 48/61; 252/376; 165/158; 518/703; 518/706

(58) Field of Classification Search ............ 252/376; 165/158; 518/706, 703
See application file for complete search history.

(56) References Cited

U.S. PATENT DOCUMENTS

| | | | |
|---|---|---|---|
| 2,896,927 A | 7/1959 | Nagle et al. | 261/35 |
| 2,929,429 A | 3/1960 | Russell et al. | 152/330 |
| 3,920,717 A | 11/1975 | Marion | 260/449.5 |
| 4,081,253 A | 3/1978 | Marion | 518/703 |
| 5,011,625 A | 4/1991 | LeBlanc | 252/376 |
| 5,122,299 A | 6/1992 | LeBlanc | 252/376 |
| 5,362,454 A | 11/1994 | Cizmer et al. | 422/201 |
| 6,005,011 A * | 12/1999 | Henningsen | 518/706 |
| 2003/0162846 A1* | 8/2003 | Wang et al. | 518/703 |

* cited by examiner

Primary Examiner—Glenn Caldarola
Assistant Examiner—Vinit H. Patel
(74) Attorney, Agent, or Firm—Lundeen & Dickenson, LLP; Bradley A. Misley

(57) ABSTRACT

Low-energy hydrogen production is disclosed. A reforming exchanger is placed in parallel with a partial oxidation reactor in a new hydrogen plant with improved efficiency and reduced steam export, or in an existing hydrogen plant where the hydrogen capacity can be increased by as much as 20–30 percent with reduced export of steam from the hydrogen plant.

19 Claims, 2 Drawing Sheets

PARTIAL OXIDATION REFORMER-REFORMING EXCHANGER ARRANGEMENT FOR HYDROGEN PRODUCTION

CROSS REFERENCE TO RELATED APPLICATIONS

This application claims the benefit of our earlier provisional application U.S. Ser. No. 60/320,011, filed Mar. 16, 2003.

BACKGROUND OF INVENTION

This invention relates to the production of a synthesis gas (syngas) using a partial oxidation (POX) reactor and a reforming exchanger.

Reforming of hydrocarbons is a standard process for the production of hydrogen-containing synthesis gas used for ammonia or methanol, for example. Conventional POX reactors are unpacked, free-flow, non-catalytic gas generators to which preheated hydrocarbon gas and oxygen are supplied, optionally with a temperature moderator. The partial oxidation reactor effluent is then quenched or cooled, typically to 200–300° C., optionally cleaned to remove soot, and usually further converted in high and low temperature shift converters wherein CO and steam react to form additional hydrogen and $CO_2$. Syngas with high hydrogen content is especially desirable for ammonia or other synthesis processes where hydrogen is the main reactant from the syngas. The steam to hydrocarbon weight ratio in the POX reactor feed is generally from 0.1 to 5, the atomic ratio of oxygen to carbon in the hydrocarbon is in the range from 0.6 to 1.6, and reaction times vary from 1 to 10 seconds.

POX reactors are described, for example, in U.S. Pat. Nos. 2,896,927; 3,920,717; 3,929,429; and 4,081,253, which are hereby incorporated herein by reference in their entirety.

POX reactors produce a syngas effluent at a very high temperature prior to quenching, e.g. from 1100° to 1650° C. This means that much of the hydrocarbon feed must, in effect, be used as a rather expensive fuel to preheat feeds and generate high- or medium-pressure steam. However, the steam production is usually far in excess of plant requirements and must therefore be exported, and frequently there is little or no market for the steam.

There is a need in the art for a way to improve efficiency of hydrogen plants that use POX reactors and reduce or eliminate the steam export. It is also frequently desired to maximize or increase hydrogen production from an existing hydrogen plant; however, the POX reactor is frequently a capacity-limiting operation. POX reactors cannot easily be expanded to increase production.

The present invention addresses these needs by supplying the partially cooled POX reactor process effluent to the shell side of a reforming exchanger to provide heat for additional syngas production. Reforming exchangers used with autothermal reformers are known, for example, from U.S. Pat. Nos. 5,011,625 and 5,122,299 to LeBlanc and U.S. Pat. No. 5,362,454 to Cizmer et al, all of which are hereby incorporated herein by reference in their entirety. These reforming exchangers are available commercially under the trade designation KRES or Kellogg Reforming Exchanger System.

SUMMARY OF INVENTION

The present invention uses a reforming exchanger in parallel with a partial oxidation (POX) reactor in a new hydrogen plant with improved efficiency and reduced steam export, or in an existing hydrogen plant. In one embodiment, the hydrogen capacity can be increased by as much as 20 to 30 percent with reduced export of steam from the hydrogen plant. The resulting process has very low energy consumption.

The present invention provides a process for preparing syngas. The method includes: (a) partially oxidizing a first hydrocarbon portion with oxygen in a partial oxidation reactor to produce a first reactor effluent; (b) cooling the first reactor effluent to a temperature from 650° and 1000° C.; (c) supplying the first reactor effluent to a reforming exchanger; (d) passing a second hydrocarbon portion with steam through a catalyst zone in the reforming exchanger to form a second reactor effluent; (e) discharging the second reactor effluent from the catalyst zone to form an admixture with the first reactor effluent; (f) passing the admixture across the catalyst zone in indirect heat exchange therewith to cool the admixture and heat the catalyst zone; and (g) collecting the cooled admixture from the reforming exchanger.

The cooling can include introducing water into the first reactor effluent as a quench fluid, indirect heat exchange, or a combination of water quenching and indirect heat exchange. The indirect heat exchange can be used to preheat the second hydrocarbon portion in a cross exchanger. The catalyst zone can include catalyst tubes. The method can also include supplying the second hydrocarbon portion to a tube side of the reforming exchanger and passing it through the catalyst tubes, and supplying the cooled first reactor effluent to a shell side inlet of the reforming exchanger. The shell side inlet can be adjacent an outlet end of the catalyst tubes. The method can further include supplying the first and second hydrocarbon portions in a weight ratio of from 40:60 to 95:5. More desirable, the first and second hydrocarbon portions can be supplied in a weight ratio of from 40:60 to 60:40 (for more efficient hydrogen production), or from 80:20 to 95:5 (if more CO is desired).

The present invention also provides a syngas production apparatus. The apparatus includes: (a) partial oxidation reactor means for partially oxidizing a first hydrocarbon portion with oxygen to produce a first reactor effluent; (b) means for cooling the first reactor effluent to a temperature from 650° to 1000° C.; (c) means for supplying the first reactor effluent to a reforming exchanger; (d) means for passing a second hydrocarbon portion with steam through a catalyst zone in the reforming exchanger to form a second reactor effluent; (e) means for discharging the second reactor effluent from the catalyst zone to form an admixture with the first reactor effluent; (f) means for passing the admixture across the catalyst zone in indirect heat exchange therewith to cool the admixture and heat the catalyst zone; and (g) means for collecting the cooled admixture from the reforming exchanger.

The present method further provides a method for retrofitting a syngas process comprising a partial oxidation reaction step for converting a first hydrocarbon stream to a first reactor effluent, a heat recovery step for cooling the first reactor effluent and producing steam with the recovered heat, and a downstream processing step for receiving the cooled reactor effluent and producing a product syngas of enhanced hydrogen content. The retrofit includes: (a) a step for partially cooling the first reactor effluent to a temperature from 650° to 1000° C.; (b) a step for diverting the partially cooled first reactor effluent to a reforming exchanger; (c) a step for passing a second hydrocarbon portion with steam through a catalyst zone in the reforming exchanger to form a second reactor effluent; (d) a step for discharging the second reactor effluent from the catalyst zone to form an admixture with the first reactor effluent; (e) a step for passing the admixture across the catalyst zone in indirect heat exchange therewith to cool the admixture and heat the catalyst zone; and (f) a step for supplying the admixture from the reforming exchanger to the heat recovery step.

DETAILED DESCRIPTION

Figure 1:
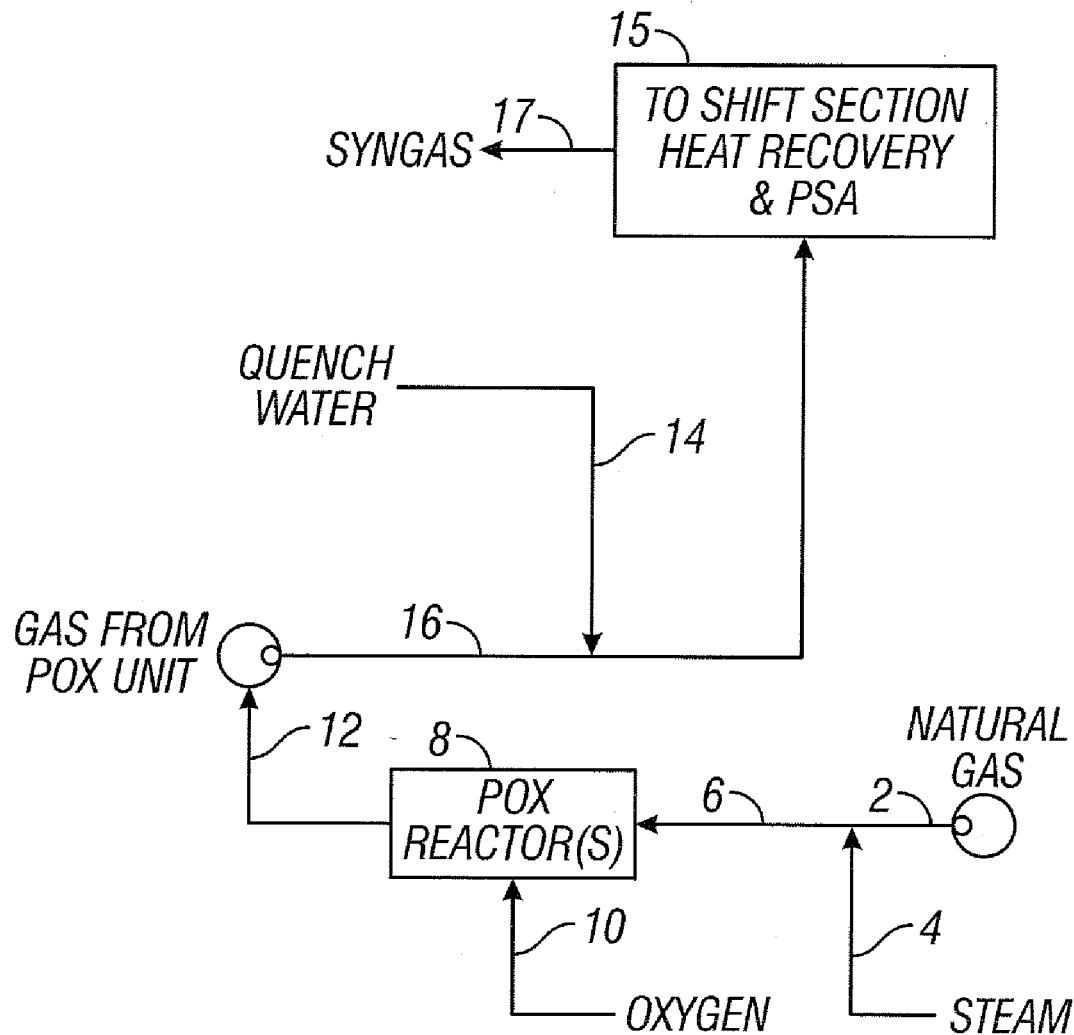
FIG. 1 is a simplified schematic process flow diagram of a conventional prior art POX process that can be retrofitted according to one embodiment of the present invention.

The retrofit candidate plants for the present invention have the general configuration shown in FIG. 1. Desulfurized natural gas or other hydrocarbon supplied from line 2 is mixed with process steam from line 4 and the mixture is preheated in a feed preheat exchanger (not shown). The preheated steam-hydrocarbon mixture is fed via line 6 to a POX reactor 8 (or a plurality of POX reactors) with oxygen 10 and the effluent is collected in line 12, quenched with water injected via line 14, and then supplied to downstream processing 15 that can include a shift section (high temperature, medium temperature and/or low temperature shift converters), heat recovery, CO2 removal (pressure swing absorption or PSA, for example), and the like. A hydrogen-rich syngas stream 17 is produced.

Figure 2:
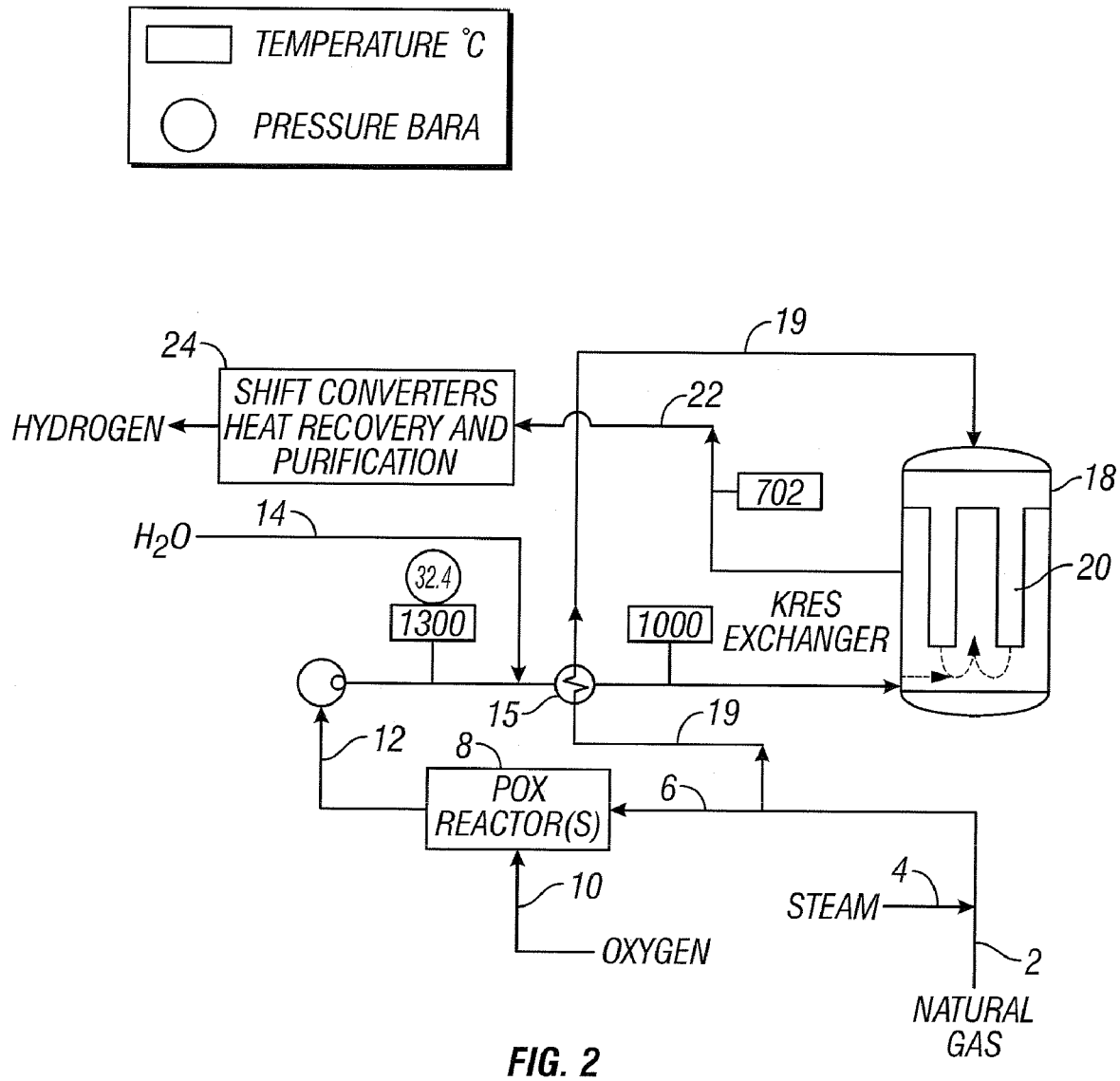
FIG. 2 is a simplified schematic process flow diagram of a syngas process with a POX reactor and a reforming exchanger integrated according to one embodiment of the invention.

The plant of FIG. 1 is retrofitted, or a new plant is built, in accordance with one embodiment of the present invention as shown in FIG. 2. The POX reactor(s) 8 and lines 2, 4, 6, 10 are conventional as described in reference to FIG. 1. The process effluent in line 12 from the POX reactor(s) 8 is quenched with process water via line 14 to 700°–1100° C., desirably 750°–1000° C., and the mixture supplied via line 16 to the shell-side inlet of the reforming exchanger 18. A heat exchanger 15 can be used in addition to, or in lieu of, quench line 14. The heat exchanger 15 can be used to preheat feed stream 19.

A preheated mixture in line 19 of steam and hydrocarbon, which can be the same or different as the hydrocarbon in line 2, is supplied to a tube-side inlet of the reforming exchanger 18. The mixture passes through the catalyst tubes 20 to form additional hydrogen-containing gas. The reformed gas from outlet openings of the catalyst tubes 20 mixes with the POX reformer effluent and the mixture passes across the outside of the catalyst tubes 20 to the shell-side outlet where it is collected in line 22 in a conventional manner. The combined syngas in line 22 is then supplied to conventional downstream processing 24 as in FIG. 2, which can include a shift converter, a heat exchange unit for the recovery of heat, and further purification, producing purified molecular hydrogen. In the retrofit application, the downstream processing units can be modified or expanded as necessary to handle the additional syngas supplied via line 22 that results from the addition of the reforming exchanger 18.

The heat requirement for the reforming exchanger 18 is met by the quantity and temperature of the POX reactor effluent. Generally, the more feed in line 19 to the reforming exchanger 18, the more heat required from the POX reactor effluent 16 to sustain the generally endothermic reforming reaction in the catalyst tubes 20. The temperature of the reformer catalyst tube effluent gas is desirably as hot as the materials of construction of the reforming exchanger 18 will allow, e.g. from 750° to 1000° C. in the standard KRES unit. If the temperature is too low, insufficient reforming can occur in the reforming exchanger 18, whereas if the temperature is too high the metallurgical considerations might become problematic. Care should also be taken to ensure that the temperature is selected to minimize metal dusting.

The proportion of hydrocarbon feed to the POX reactor(s) 8 can range from 40 to 95 percent of the total, whereas the proportion to the reforming exchanger 18 can be from 5 to 60 percent of the total hydrocarbon feed. The feed split between the POX reactor(s) 8 and the reforming exchanger 18 is desirably such that the POX reactor(s) 8 must produce a suitable volume of hot effluent to provide the heat requirements of the reforming exchanger 18. A feed split to the POX reactor(s) 8 of from 40 to 60 percent of the total is beneficial for improved energy efficiency and maximizing the hydrogen production rate, whereas feeding from 80 to 95 percent of the total hydrocarbon feed to the POX reactor(s) 8 is beneficial for making more CO in the syngas.

The present invention is illustrated by way of an example. Preliminary process design parameters for an integrated POX-reforming exchanger unit installed as in FIG. 2 were developed based on the retrofit of the typical POX process of FIG. 1 with the stream composition and flow rate for line 16 indicated in Table 1 below. Compositions, properties and flow rates for selected streams in the process modified in accordance with the configuration of FIG. 2 are also shown in Table 1.

TABLE 1

POX Reactor-Reforming Exchanger Configuration

| | Stream ID: | | | |
|---|---|---|---|---|
| | POX Effluent Line 16 | Catalyst Tube 20 Inlet | Catalyst Tube 20 Exit | Shell-Side Outlet Line 22 |
| Component | Stream Composition, dry mole percent | | | |
| $H_2$ | 62.35 | 1.80 | 73.79 | 64.21 |
| $N_2$ | 0.66 | 1.80 | 0.47 | 0.63 |
| $CH_4$ | 0.66 | 94.40 | 3.04 | 1.05 |
| Ar | 0.11 | 0.00 | 0.00 | 0.09 |
| CO | 33.26 | 0.10 | 16.52 | 30.54 |
| $CO_2$ | 2.96 | 0.20 | 6.17 | 3.49 |
| $C_2H_6$ | 0.00 | 1.20 | 0.00 | 0.00 |
| $C_3H_8$ | 0.00 | 0.30 | 0.00 | 0.00 |
| $i-C_4$ | 0.00 | 0.10 | 0.00 | 0.00 |
| $i-C_5$ | 0.00 | 0.10 | 0.00 | 0.00 |
| Total Flow, kmol/hr | 636.2 | 32.1 | 123.5 | 759.7 |
| $H_2O$, kmol/hr | 153.2 | 85.8 | 50.3 | 203.5 |
| Total Flow, kmol/hr | 789.4 | 117.9 | 173.8 | 963.1 |
| Total Flow, kg/hr | 10,528 | 2,073 | 2,073 | 12,601 |
| Pressure (bar (a)) | 32.4 | 35.5 | 32.4 | 32.1 |
| Temperature (° C.) | 999.7 | 308.8 | 938.1 | 702.3 |

In the base case with a POX reactor only, the syngas produced from the reforming section of the plant will have the composition and flow rate of the POX reactor effluent in line 16. Using the reforming exchanger in parallel with the POX reactor according to this embodiment of the invention, the effluent in line 16 is mixed with the gas exiting the catalyst tubes 20 to obtain a syngas having the composition in line 22. This example shows that an integrated POX-reforming exchanger process can be used to recover waste heat in the reforming exchanger and increase hydrogen production by 20 to 25 percent. Using process heat for the additional hydrogen generation in this manner yields a corresponding reduction in steam export.

The invention is described above with reference to non-limiting examples provided for illustrative purposes only. Various modifications and changes will become apparent to the skilled artisan in view thereof. It is intended that all such changes and modifications within the scope and spirit of the appended claims be embraced thereby.

The invention claimed is:

1. A process for preparing syngas, comprising:
   partially oxidizing a first hydrocarbon portion with oxygen in a partial oxidation reactor to produce a first reactor effluent;
   cooling the first reactor effluent to a temperature from 650° to 1000° C., said cooling including direct heat exchange with water introduced into the first reactor effluent as a quench fluid;
   supplying the cooled first reactor effluent to a reforming exchanger;
   passing a second hydrocarbon portion with steam through a catalyst zone in the reforming exchanger to form a second reactor effluent, wherein the first and second hydrocarbon portions are supplied in a weight ratio of from 40:60 to 60:40;
   discharging the second reactor effluent from the catalyst zone to form an admixture with the first reactor effluent;
   passing the admixture across the catalyst zone in indirect heat exchange therewith to cool the admixture and heat the catalyst zone; and
   collecting the cooled admixture from the reforming exchanger.

2. The process of claim 1, wherein the first reactor effluent cooling further comprises indirect heat exchange downstream from the direct heat exchange and upstream from the reforming exchanger.

3. The process of claim 2, wherein the first reactor effluent cooling by indirect heat exchange comprises heating the second hydrocarbon portion upstream from the catalyst zone in a cross exchange.

4. The process of claim 1, wherein the catalyst zone comprises catalyst tubes.

5. The process of claim 3, wherein the second hydrocarbon portion is supplied to a tube side of the reforming exchanger and passed through the catalyst tubes.

6. The process of claim 5, wherein the cooled first reactor effluent is supplied to a shell side inlet of the reforming exchanger.

7. The process of claim 6, wherein the shell side inlet is adjacent an outlet end of the catalyst tubes.

8. An apparatus for producing syngas, comprising:
   partial oxidation reactor means for partially oxidizing a first hydrocarbon portion with oxygen to produce a first reactor effluent;
   means for cooling the first reactor effluent to a temperature from 650° to 1000° C., said cooling means including means for introducing water into the first reactor effluent as a quench fluid for direct heat exchange;
   means for supplying the cooled first reactor effluent to a reforming exchanger;
   means for passing a second hydrocarbon portion with steam through a catalyst zone in the reforming exchanger to form a second reactor effluent, wherein the first and second hydrocarbon portions are supplied in a weight ratio of from 40:60 to 60:40;
   means for discharging the second reactor effluent from the catalyst zone to form an admixture with the first reactor effluent;
   means for passing the admixture across the catalyst zone in indirect heat exchange therewith to cool the admixture and heat the catalyst zone;
   means for collecting the cooled admixture from the reforming exchanger; and
   means for shift converting the collected admixture to increase hydrogen content.

9. The process of claim 1 wherein the partial oxidation reactor is a non-catalytic reactor.

10. The process of claim 1 wherein the partial oxidation reactor is a free flow, unpacked, non-catalytic reactor.

11. The process of claim 1 wherein a temperature of the first reactor effluent is greater than 1000° C.

12. A process for preparing a hydrogen-rich syngas, comprising:
    partially oxidizing a first hydrocarbon portion with oxygen in a non-catalytic partial oxidation reactor to produce a first reactor effluent having a temperature greater than 1000° C.;
    cooling the first reactor effluent to a temperature from 650° to 1000° C.;
    said cooling including;
    direct heat exchange with water introduced into the first reactor effluent as a quench fluid; and
    indirect heat exchange in a cross exchange downstream from the direct heat exchange and upstream from the reforming exchanger comprising heating the second hydrocarbon portion upstream from the catalyst zone;
    supplying the cooled first reactor effluent to a reforming exchanger;
    passing a second hydrocarbon portion with steam through a catalyst zone in the reforming exchanger to form a second reactor effluent, wherein the first and second hydrocarbon portions are supplied in a weight ratio of from 40:60 to 60:40;
    discharging the second reactor effluent from the catalyst zone to form an admixture with the first reactor effluent;
    passing the admixture across the catalyst zone in indirect heat exchange therewith to cool the admixture and heat the catalyst zone; and
    collecting the cooled admixture from the reforming exchanger.

13. The process of claim 12, wherein the catalyst zone comprises catalyst tubes.

14. The process of claim 13, wherein the second hydrocarbon portion is supplied to a tube side of the reforming exchanger and passed through the catalyst tubes.

15. The process of claim 14, wherein the cooled first reactor effluent is supplied to a shell side inlet of the reforming exchanger.

16. The process of claim 15, wherein the shell side inlet is adjacent an outlet end of the catalyst tubes.

17. The process of claim 1, wherein the partial oxidation reactor, catalytic reactor and the cooling of the first reactor effluent are operated to favor hydrogen production over carbon monoxide production.

18. The process of claim 1, further comprising shift converting the collected admixture to increase hydrogen content.

19. The process of claim 1, wherein the cooled first reactor effluent supplied to the reforming exchanger has a water content in excess of stoichiometric for shift conversion of CO.

* * * * *